United States Patent [19]

Wilson et al.

[11] 4,378,217
[45] Mar. 29, 1983

[54] TERMINAL TRAINER KEYBOARD AND DISPLAY APPARATUS FOR TEACHING KEYBOARD OPERATIONS AND KNOWLEDGE ITEMS

[75] Inventors: Marlin V. Wilson, Barboursville; John R. Ward, Stanardsville, both of Va.; Lawrence C. Nickell, Fairlea, W. Va.

[73] Assignee: Training Associates, Inc., Ronceverte, W. Va.

[21] Appl. No.: 293,092

[22] Filed: Aug. 17, 1981

Related U.S. Application Data

[63] Continuation of Ser. No. 62,520, Jul. 30, 1979, abandoned.

[51] Int. Cl.³ .................... G09B 13/00; G09B 7/04
[52] U.S. Cl. ................................. 434/228; 434/325
[58] Field of Search ............. 434/228, 227, 324, 325, 434/337, 231

[56] References Cited

U.S. PATENT DOCUMENTS 3,100,351  8/1963  Priednieks et al. ............... 434/227
3,423,845  1/1969  Edge et al. ....................... 434/231
3,882,490  5/1975  Tashiro et al. ................. 362/800 X
3,894,346  7/1975  Ward et al. ...................... 434/228

Primary Examiner—William H. Grieb
Attorney, Agent, or Firm—Mason, Fenwick & Lawrence

[57] ABSTRACT

Terminal trainer keyboard and display apparatus for teaching keyboard operations and knowledge items and skills, including a keyboard array of touch keys representing individual characters and keyboard operations each having a switch associated therewith, a visual projector to be located within view of the trainee having a viewing screen onto which lesson information is displayed projected from a training film having sensor activating code bars beside the film frames denoting the correct key location for the displayed lesson instruction. The keyboard includes a light emitter at each key for illuminating its associated key, and an electronic circuit is coupled to the switches and receives correct key location signals from the sensors detecting the code bars to activate correct and incorrect readout counters to indicate the number of correct and incorrect key activations and to activate the light emitter at the correct key location when a key at an incorrect location is activated.

19 Claims, 7 Drawing Figures

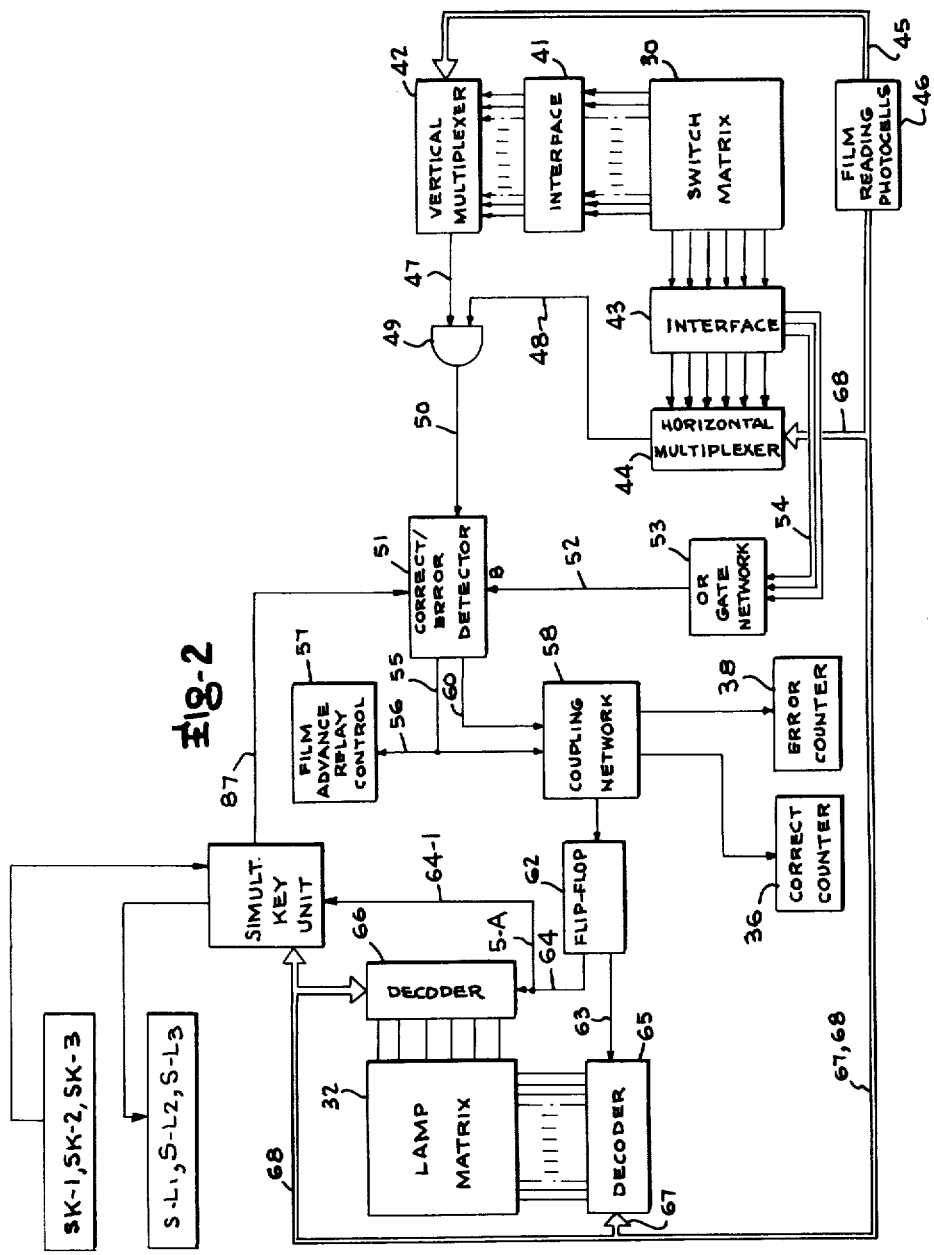

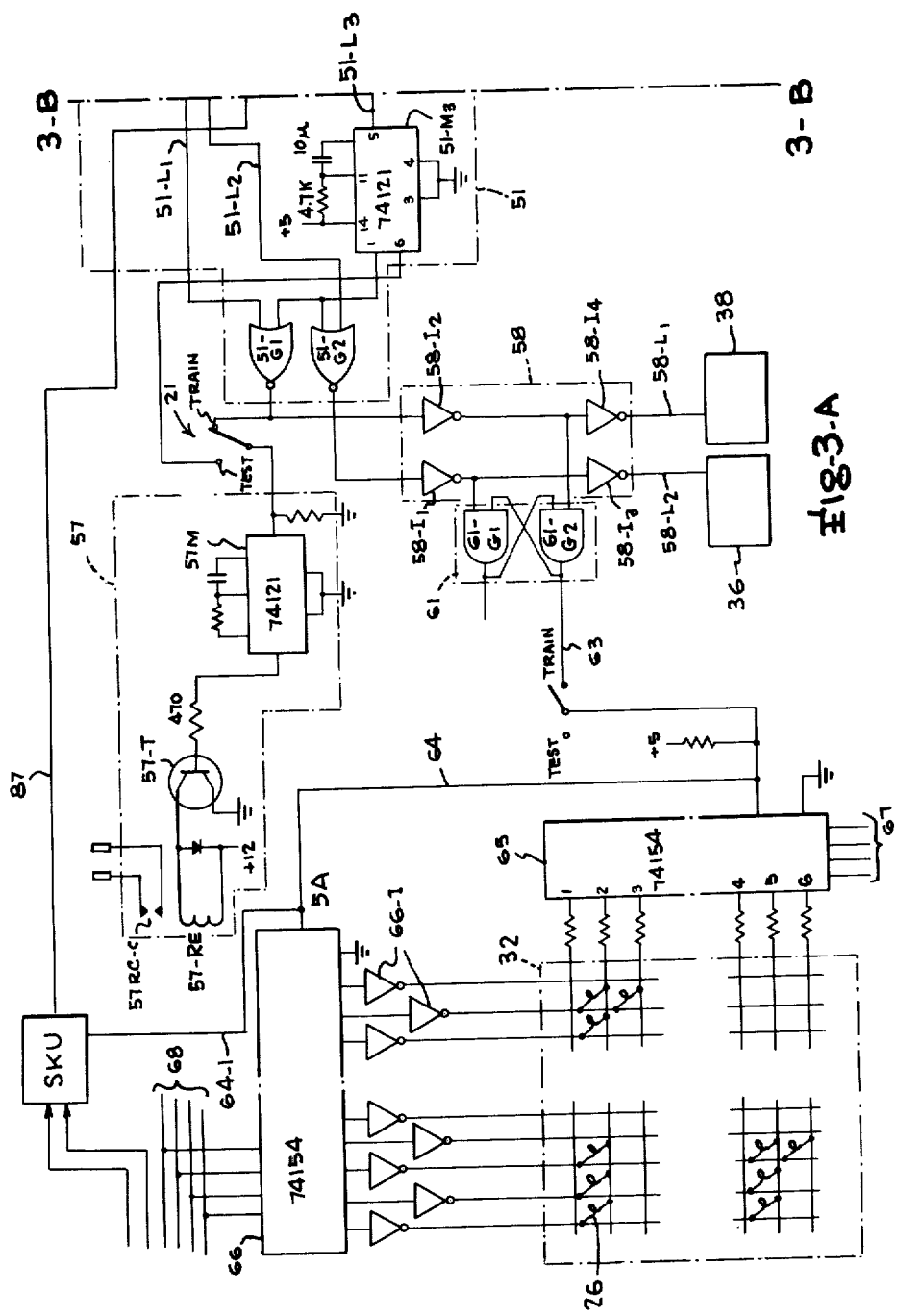
Fig-3-A

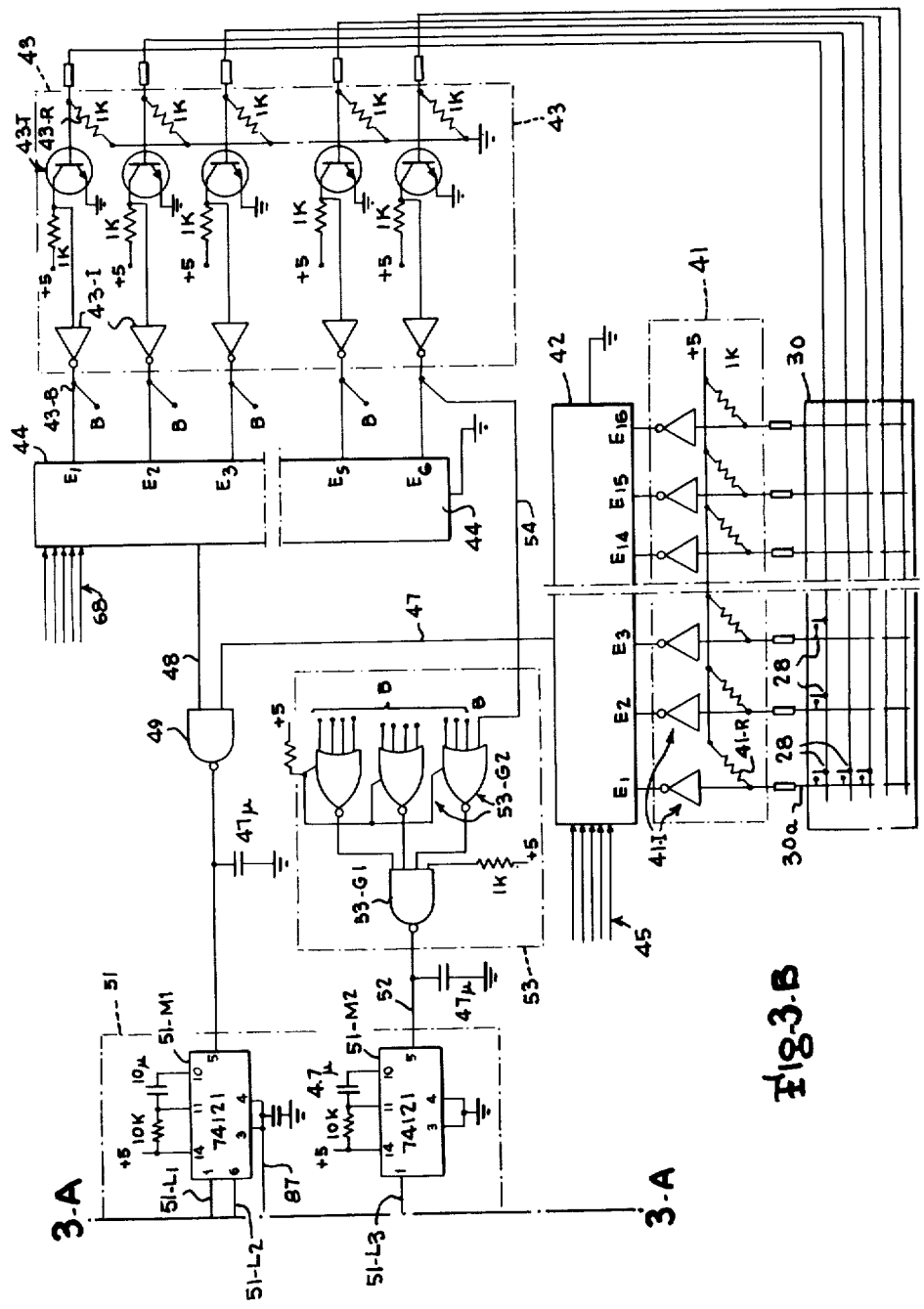
Fig-3-B

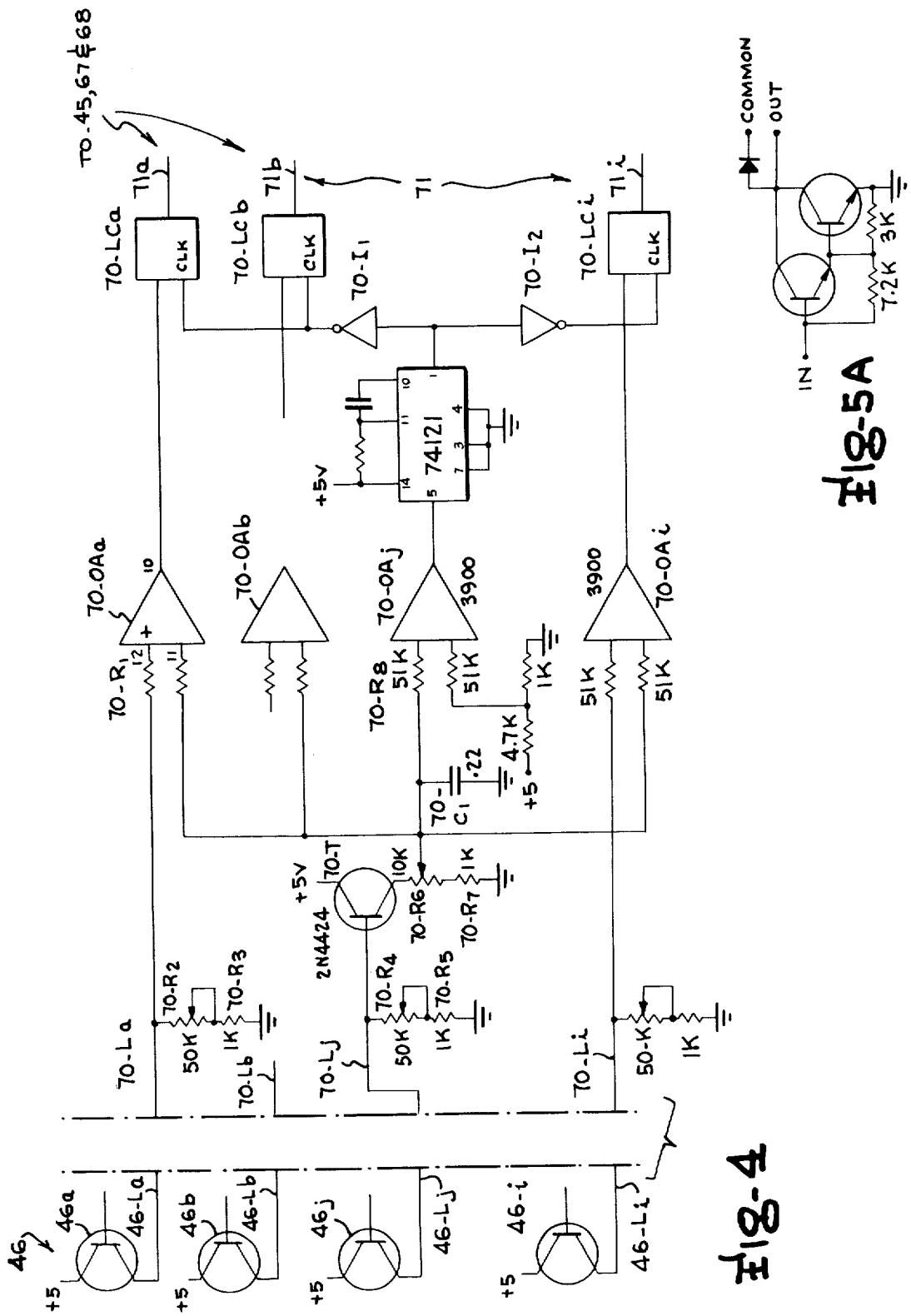

TERMINAL TRAINER KEYBOARD AND DISPLAY APPARATUS FOR TEACHING KEYBOARD OPERATIONS AND KNOWLEDGE ITEMS

This is a continuation of application Ser. No. 62,520 filed July 30, 1979, now abandoned.

BACKGROUND AND OBJECTS OF THE INVENTION

The present invention relates in general to keyboard training apparatus for training operators of keyboard equipment such as keyboard-type computer terminals, typewriters, and similar devices, and more particularly to keyboard training apparatus having a keyboard and display screen associated therewith wherein a visual display of a lesson item of information or instruction is produced on the display screen and the trainee's response is electronically monitored to count correct and incorrect responses and regulate advancement of the display and selectively indicate correct key locations.

Heretofore, trainees attempting to learn to operate keyboard instruments such as typewriters, adding machines, computer terminals, keypunch machines and similar types of devices, had until recent years to rely upon a slow training process such as courses offered in public and private schools and similar training programs employing conventional class instruction techniques and long practice time to acquire the skill of keyboard operation over a long period of time. Extensive practice and classroom work in operation of real or simulated keyboards of the appropriate type permit one to acquire improved keyboard operating skills, but this has been a slow-skill acquiring process. In recent years, efforts have been made to increase the speed of acquisition of desired skills by supplementing these conventional instruction techniques with the use of specialized keyboard trainer units. Examples of such trainer units may be found in prior U.S. Pat. No. 3,894,346 granted July 15, 1975 to John R. Ward, one of the co-inventors named in this application, together with another co-inventor, and U.S. Pat. No. 3,423,845 granted Jan. 28, 1969 to G. M. Edge et al. These devices permit the use of individual instruction in keyboard use, with the program designed to be appropriate to the student's ability and level of skill. Such prior devices have included a keyboard and a keyboard representation or simulating panel in which individual keys can be lighted to prompt the operator to appropriate key locations on the keyboard and a controlled program device connected to both the keyboard and the keyboard display for presenting exercises to the student. In the first mentioned of the above two patents, the keyboard trainer requires a first unit having an operating keyboard and a display panel having individual lights corresponding to each of the individual keys, designed to be used in conjunction with another unit such as a visual display and/or an audio output providing instructions for the trainee. However, we have recognized that such devices have limitations either in regard to their design, character of operation, or versatility of operation Accordingly, an object of the present invention is the provision of a novel keyboard training apparatus having provision of an operable keyboard simulating the keyboard of a computer terminal, typewriter, or similar device wherein the keys of keyboard include separate light means for each key to selectively illuminate the key, together with a visual display screen forming a unitary part of the training device along with the keyboard for visual display of instructions, lesson information, and similar knowledge item, wherein the trainer unit has great versatility and convenience of handling and use.

Another object of the present invention is the provision of a novel keyboard trainer as described in the immediately preceding paragraph, including means for electronically monitoring the trainee's response to instructional or lesson information on the display screen to count correct and incorrect responses, and to advance lesson information on the display screen to the next item only when a correct response to the existing lesson information has been made.

Another object of the present invention is the provision of a novel keyboard apparatus having an operating keyboard wherein the keys are each individually illuminated by associated lamps to indicate the correct key which should have been activated by the trainee for a particular lesson item being displayed on a lesson display screen when the trainee has activated an incorrect key responsive to the lesson, and wherein lesson items on the display screen are advanced only when the correct key or keys indicated by the lesson have been activated.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 2 is a block diagram of the electronic circuitry of the keyboard training system;

FIGS. 3A and 3B collectively are a schematic diagram of the circuitry associated with the keyboard console unit except for the film code sensing portions for the audio/visual projector display component;

FIG. 4 is a schematic diagram of the circuitry employed between certain of the light-sensing photocells for sensing the light code marginal identifications on the training film which displays lessons on the audio/visual projector display screen to provide the signals for addressing the console unit circuitry;

FIG. 5 is a schematic diagram of circuitry and simultaneous key interface connections indicated by the interface block IB-A in FIG. 3a; and FIG. 5A is a schematic circuit of one of the three transistor driver pairs included in the ULN2001A Integrated Circuit of FIG. 5.

DETAILED DESCRIPTION OF A PREFERRED EMBODIMENT

Figure 1:
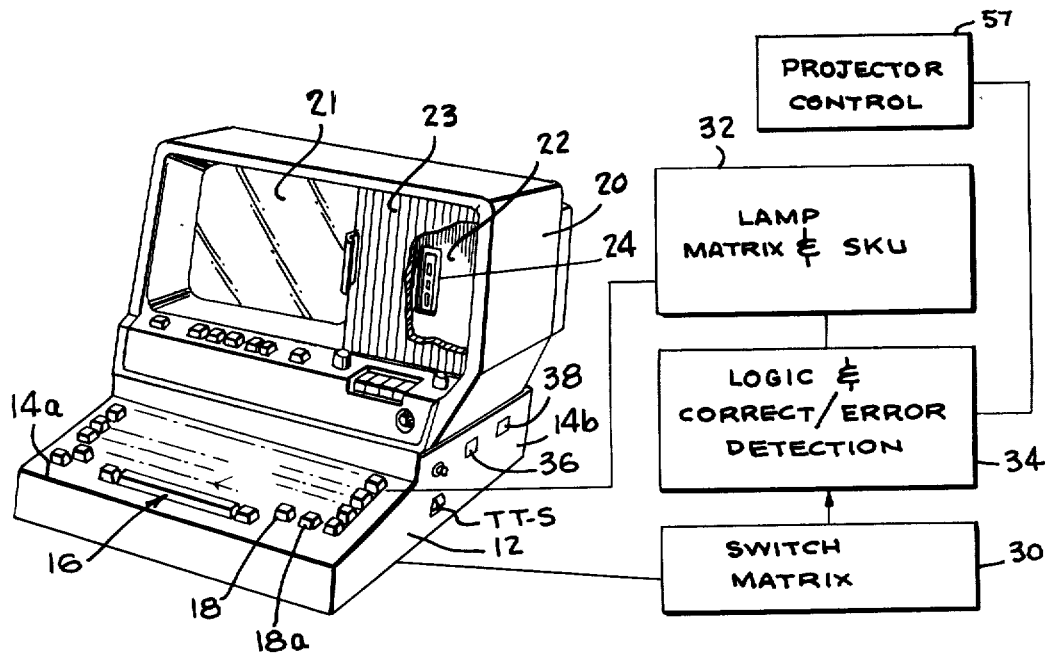
FIG. 1 is a somewhat diagrammatic illustration of the main components of the keyboard training system and apparatus of the present invention, with electronic portions illustrated in block diagram form.

Referring to the drawings, wherein like reference characters designate corresponding parts throughout the several figures, there is shown an embodiment of a keyboard or terminal training system and apparatus of the present invention designed to rapidly train persons to become skilled in operating keyboard instruments such as typewriters, adding machines, computer terminals, keypunch machines and similar types of devices. The system and apparatus of the present invention is indicated somewhat diagrammatically in FIG. 1 and comprises a keyboard terminal trainer or the like, indicated generally by the reference character 10, in the form of apparatus or an assembly made up of a keyboard console or base unit 12 containing a front inclined panel portion 14a having a keyboard 16 formed of a plurality of individual manual keys or key simulating switch members 18 arranged thereon in a manner simulating the arrangement of keys on the keyboard to be learned, and having rearwardly of the panel portion a base console portion or housing portion 14b providing an enclosure for most of the electronic circuitry. The base portion provides a supporting base on which is surmounted an audio/visual display unit or projector 20 having a display screen or viewing screen 21 on which is projected a visual image of the instruction material to be followed by the trainee. The projector also includes a cartridge receiving cavity 22, which in the illustrated embodiment is located behind a sliding panel 23, to receive a program cartridge 24, in the form of a film cassette or the like. The cartridge provides the source of the instructional material to be projected onto the screen 21 and viewed by the trainee as well as containing certain marginal coded information, as later described, identifying the correct keys or switches 18 which should be depressed or touched in response to the particular associated film frame being imaged on the screen. For example, the audio/visual projector or display unit 20 may be a projector and cassette tape player unit of the type manufactured by Charles Beseler Company under the Trademark BESELER Cue/See.

The keys or key simulating switch members 18 on the keyboard 16, in the illustrated embodiment, may be keys of generally rectangular configuration formed of colored plastic in the form of a downwardly opening boxlike shell of rectangular or cubic configuration housing a small lamp or light emitting diode 26 (assumed to be lamps hereinafter for purposes of this description) for each individual key. The shell portion of each key 18 is coupled to the movable contact member or portion of an associated electrical switch, and the keys 18 may be arranged in a plurality of ways, for example in five horizontal rows of a plurality of such keys and a sixth row simulating a spacer bar and right and left shift keys, with the keys in various regions or zones formed of plastic of different colors, all arranged over a switch matrix 30 housed within the panel portion 14a below the keyboard. A lamp matrix 32 is provided in the base console portion of housing portion 14b of the unit 12 as well as electronic circuitry forming interfaces, multiplexers, correct/error detectors, film advancing control, gate networks, coupling networks, correct and error counters, and decoders, and film reading photocells, all indicated generally at 34 and described in greater detail hereinafter.

The system is designed to use a structured series of program lessons recorded on the film cassette, indicated at 24, containing instructional material to stimulate the trainee to operate the keys 18 making up the keyboard 16 in accordance with a particular training scheme. The audio/visual display unit or projector 20 provides a visual image of instruction, material, questions or message units, or whatever stimulus is needed for the specific training requirements of the operator, to cause the operator to operate the keys of the keyboard console in a particular manner. The keyboard console unit 12 contains a logic discriminator, error detection circuitry, scoring mechanism, position switches, and other electronic circuitry, to monitor the operator's actuation of the keyboard switches. The operator or trainee responds to the material or information on the visual screen 21 by touching one of the keys or a position on the keyboard 16, and electrical connections between the audio/visual unit 20 and the keyboard console 12 monitor the touching of the keys so that if the operator depresses the correct key, a new visual image will automatically appear on the screen 21. However, if the operator's response is in error, a warning signal will appear by illumination of the lamp for the correct key which should have been touched, and the operator must correct the input by touching the correct key before the film cassette is advanced to display a new visual image. In other words, the operator or trainee is advised when his response does not match the required response. Where the response by the trainee or operator does not match the required response, as by depressing the wrong manual key 18, the error signal is produced indicated by energizing of the lamp for the correct key, and the image on the display screen is held, until the correct response is made. Correct key operation and error key operation is monitored and is continuously counted and recorded by correct count and error count readouts 36,38.

The trainee or learner proceeds one step at a time, expanding his or her knowledge as quickly as the material is correctly dealt with. Through instant feedback, the trainee is not allowed to make mistakes, or, in other words, cannot learn the material incorrectly, because of the error signal and indication by the illuminating or energizing of the lamp for the correct key when an error is made. Only correct responses allow the trainee to advance in the program, and thus the trainee is not allowed to learn incorrectly. As the trainee responds to a projected image, only the correct response will permit the program to advance.

The switches associated with the manual key 18 of the keyboard 16 and forming the switches for the switch matrix 30 are snap-action switches which provide instant operator feedback so that the trainee never learns information incorrectly, since activation of an erroneous manual key causes the correct manual key to be illuminated by its associated lamp 26 and the program on the cassette 24 will not advance until the correct key has been activated. Only a correct response by activation of the correct manual key 18 will advance the program. In this manner, the operator or trainee knows immediately whether he or she has made the correct response. The correct counter 36 and an error counter 38 in the form of digital scoring readouts provide performance indicators which give continuous feedback to the trainee or to the instructor of performance. These scoring counters are positioned on the side of the console base portion 14b so that the trainee cannot see them and thereby be distracted in the learning process.

The operator also uses the audio/visual projector unit 20 as a device for basic keyboard training as a prelude to any of the message or system training. The system provides a convenient vehicle to economically introduce audio and visual stimuli to help early learning, and allows for an introduction or overview of the job and the relationship of the job to training. Definitions of words, abbreviations for different commands, and similar instructional information in the nature of a dictionary of terms and vocabulary for various communication systems can also be conveniently introduced by inclusion in the cassette film program. By the provision of the counters or performance readouts 36,38, the system provides a means of evaluating the performance of a trainee electronically and there is no need to have someone monitor his or her performance, as the digital counters exhibit the score. This information can be displayed remotely as well, and simplifies testing and removes questions of personality conflict.

The electronic circuitry 34 for controlling and interrelating functions of the keyboard 16 and projector unit 20 of the system and the coded information on the border of the training film 24 shown in block diagram form in FIG. 2, and the principal electronics of the system is shown schematically in FIGS. 3A and 3B. Referring to the block diagram of FIG. 2, it will be seen that the system includes the switch matrix 30, which is a grid matrix on a printed circuit board or boards in the illustrated example having conventional connections between the key switches activated by the manual keys 18 of the training keyboard 16 and the horizontal and vertical conductors of the matrix 30 near the cross-over points of the matrix to connect one horizontal matrix conductor with one vertical matrix conductor, for each switch, in accordance with conventional practice. For example, a typical training keyboard 16 may be served by a matrix of 6 horizontal matrix conductors and 16 vertical matrix conductors. The vertical conductor outputs from the switch matrix 30 are connected through an interface 41 to a vertical multiplexer 42 and the horizontal matrix conductors are connected through interface 43 to a horizontal multiplexer 44. The vertical multiplexer 42 also receives on the address lines 45 signals from the film reading photocells 46 in the projector 20, later described, which read a light bar pattern on the margin of the film alongside the frame being displayed providing a properly coded readout of the proper key position on the switch matrix (and training keyboard) for the letter or symbol being displayed on the projector screen.

Leads 47 and 48 from the vertical multiplexer 42 and horizontal multiplexer 44 respectively are the two inputs to NAND gate 49 having its output connected by lead 50 to error detector 51. An output is provided on lead 47 if the key switch 28 of the training keyboard key 18 which is depressed by trainee is in the correct vertical column of the matrix 30 (for the light bar code pattern of the film frame being displayed) and an output occurs on lead 48 if the activated key switch is in the correct horizontal row of the matrix 30. There is no output on lead 47 if the activated key switch 28 is in the wrong vertical column, and no output on lead 48 if the key switch is in the wrong horizontal row. Outputs on both leads 47 and 48, indicating the correct key switch 28 was activated, causes NAND gate 49 to provide a logic 1 output to the error detector 51. Correct/error detector 51 also receives signals on output lead 52 from a multiple input positive OR gate network 53 connected by leads 54 to the interface 43, thus providing a signal indicating that a key switch 28 has been activated, whether or not it is in the correct location.

Correct/error detector 51 has a first output 55 which connects by branch 56 to the input of film advance relay control 57 to activate the projector 20 to advance the film cassette 24 to display the next film frame when the correct key switch 28 has been activated for the preceding frame. This output 55 also connects to a coupling network 58 for supplying signals to the correct readout counter 36 and the error counter 38, and to a matrix 32 for the key lamps 26 under the keys 18 to illuminate the correct key lamp 26 when a wrong key switch 28 is activated. Output 60 from the correct/error detector 51 to the coupling network 58 provides signals causing the error counter 38 to advance.

As shown in FIG. 2, the upper output lead 61 applies signals from the correct/error detector 51 and coupling network 58 to a flip-flop 62 having two outputs 63 and 64 to a vertical decoder 65 and horizontal decoder 66 respectively, supplying voltages on the vertical conductors and horizontal conductors of the keyboard lamp matrix 32. These decoders 65,66 are also supplied by address lines 67,68 from the film light bar reading photocells 46 to cause the proper pair of vertical and horizontal conductors of the key lamp matrix 32 to be supplied with voltages illuminating the key illuminating lamps 26 for the correct key 18 on the training keyboard 16.

Referring now to FIGS. 3A and 3B, which collectively constitute a schematic diagram of the electronic circuitry shown in block diagram form in FIG. 2, it will be seen that the switch matrix 30 has its vertical conductors, one of which is indicated at 30a connected through the interface 41 to the vertical multiplexer 42. The interface 41 comprises a bank of inverters 41-I connected between terminals for the respective vertical conductors of the switch matrix 30 and the entries, such as E1,E2, etc. of the multiplexer 42, which may be a Texas Instruments 74150 multiplexer. The leads of the interface between the inverters and the connections to the vertical conductors of the switch matrix are each connected by a resistor 41R to a positive voltage source, for example at +5 volts DC, thus normally holding the input of the associated interface inverter at about +5 volts unless the associated vertical conductor of the switch matrix 30 has been connected to one of the horizontal conductors of the matrix by closing of one of the key switches 28. When one of the key switches 28 of the associated vertical conductor of the switch matrix, for example conductor 30a, is closed connecting that conductor to one of the horizontal conductors, the input of the inverter 41-I, for that conductor goes almost to ground. Address information for the vertical multiplexer 42 is supplied along the address lines, indicated generally at 45, providing signals from the film reading photocells 46, and the vertical multiplexer 42 is thus addressed so as to provide an output on the lead 47 to the NAND gate 49 if one of the key switches 28 associated with the switch matrix vertical conductor 30a (indicated as the correct vertical conductor by the address signals) has been pushed or activated and the key switches for the other vertical conductors of the matrix have not been activated.

Similarly, the horizontal conductors of the switch matrix 30 are connected by conductors to the horizontal interface 43, including a transistor 43-T and an inverter 43-I for each horizontal conductor of the switch matrix and connect to the horizontal multiplexer entries 44-E1,44-E2, etc. As shown, the base of each of the transistors 43-T, each of which may be a 2N4424, is connected through a 1K resistor 43-R to electrical ground, and the collector of each transistor 43-T is connected through a resistor to +5 volts and also to the input of a respective one of the inverter 43-I, so that the input of the inverter (which may be TI7404's) is normally held at about 5 volts and goes to near zero volts when a key switch of the switch matrix 30 connected to the horizontal matrix conductor, for example conductor 30b, associated with that particular interface transistor and inverter has been closed. The horizontal multiplexer 44 is supplied with address lines 68 from the film reading photocells to address the multiplexer 44 properly in accordance with the light bar code on the film frame being displayed to indicate the correct horizontal switch matrix conductor which should have been activated by the key switch depressed by the trainee. Therefore, if the correct horizontal conductor coordinate for the proper key 18 has been depressed, closing the key switch 28 for that horizontal conductor, the output lead 48 from the multiplexer 44 will go low during closure of the key switch so that the NAND gate 49 will be provided with low inputs on both leads 47 and 48 and provide a high output on its output lead 50 indicating a correct activation of one of the switches of the switch matrix. This high output on the lead 50 from NAND gate 49 provides a correct input to a one-shot multivibrator 51-M1 of the correct/error detector 51, which has resistors and capacitors, such as a 4.7K resistor and a 10 µf capacitor, connected across pins 14, 11 and 10, as shown, to determine the pulse width and provide a negative going pulse going from +5 to about zero volts on lead 51-L1 and a positive going pulse going from about zero to about +5 volts on output lead 51-L2, connected to pins 1 and 6 respectively of 51-M1, each pulse having a duration of about 200 milliseconds. These leads 51-L1 and 51-L2 provide one of the inputs for the two NOR gates 51-G1 and 51-G2 respectively of the correct/error detector, the gate 51-G1 being the correct indicating gate, and the gate 51-G2 being the error indicating gate.

Connections are also provided from the terminals 43-K of the interface 43 along leads 54 to OR gate network 53, which as shown in the schematic diagram is formed from a NAND gate 53-G1 and a set of NOR gates 53-G2 connected so that the output from one of the set of gates 53-G2 goes low or to logic zero if the input to any of this set of NOR gates 53-G2 goes high and thus provide a high output on lead 52 from the NAND gate 53-G1 if any key switch 28 of the switch matrix 30 is closed by the trainee, regardless of whether or not it was the correct key. Thus the output from the OR gate network unit 53 provides a high or logic one output when someone has depressed one of the keys 18, regardless of whether it was in the correct location. This output lead 52 from the OR gate network 53 is applied to a one-shot multivibrator 51-M2 of the correct/error detector 51, connected as shown to provide a 25 millisecond negative going pulse from about +5 volts to about zero volts on the lead 51-L3 connected from 51-M2 to another one-shot multivibrator 51-M3. The multivibrator 51-M3 is activated by the trailing edge of this pulse on 51-L3 to provide a negative going 50 millisecond pulse from about +5 volts to zero volts on the lead 51-L4 providing the other input for each of the NOR gates 51-G1 and 51-G2, and to provide a 50 millisecond positive going pulse from about zero volts to about 5 volts on another output lead 51-L5 going to the test contact member of a training/test mode switch TT-S.

The output from the correct count indicating gate 51-G2 of the correct/error detector 51 is connected through lead 55 to the coupling network 58 made up of inverters 58-I1 through 58-I4, formed of, for example, Texas Instruments 7404 inverters, providing outputs 58-L1 and 58-L2 to the correct indicating readout counter 36 and the error indicating readout counter 38, and leads 58-L3 and 58-L4 from this coupling network are connected to cross-connected NAND gates 62-G1 and 62-G2 forming the flip-flop circuit 62 to cause the output lead 63 to go from logic one or high of about 5 volts to logic zero when an error is indicated by the NAND gate 51-G2 and supply an enable signal to the error entry of decoders 65 and 66.

The output lead 55 of correct indicating NOR gate 51-G1 is also connected through the training mode switch TT-S as indicated, to the one-shot multivibrator 57-M of the film advance relay control circuit 57, which is a one-shot multivibrator arranged to provide a positive going output pulse from zero to about 5 volts of about 200 milliseconds when a correct key 18 has been touched, applied to the base of the transistor 57-T whose collector connects to one side of the coil of the film advance relay 57-RE, connected at its other end to a suitable supply such as a 12 volt source. The contacts 57-RE-C of the relay are closed upon energizing of the relay, when the transistor 57-T conducts responsive to the correct indicating NOR gate 51-C1 going high and the pulse thus generated by the one-shot multivibrator 57-M, and the contacts 57-RE-C are connected by leads 57-L1 to a film advancing solenoid or relay in the projector to advance the training film to the next frame. It will be noted that when the training mode contacts of the training/test mode switch TT-S are open and the test mode contacts are closed, the connection from the output of the correct indicating NOR gate 51-G1 to the multivibrator 57-M is broken, and the input to multivibrator 57-M is connected to the lead 51-L5 of multivibrator 51-M3 in the correct/error detector circuit, causing the film to be advanced each time any key switch is activated, thus placing the unit in the test mode wherein the film is advanced to the next frame each time the trainee depresses a key 18 on the training console keyboard 16 regardless of whether he depresses a correct key or a wrong key. The one-shot multivibrator 57-M and the one-shot multivibrators 51-M1, 51-M2 and 51-M3 may all be Texas Instruments 74121 multivibrators.

The vertical decoder 65 is supplied with address lines 67 from the film reading photocells 46, and is connected through resistors to the vertical conductors of key lamp matrix 32 connected to lamps 26 under the keys 18 on the training keyboard 16 and is enabled by the lead 63 going low to supply voltage to the vertical conductor of the key lamp matrix 32 for the correct key location. The horizontal decoder 66 is addressed by signals on the address lines 68 from the film reading photocells 46 and is enabled by the lead 63 going low, indicating a wrong key, to cause the output lead from the decoder 66 for the correct horizontal conductor of the matrix 32 to go low, and this is inverted by one of the inverters 66-I. for example, Texas Instruments 7404 inverters, to cause the horizontal conductor of the key lamp matrix 32 for the proper sort position to go high, thus activating the lamp 26 cross-connecting the appropriate horizontal and vertical conductors of the key lamp matrix 32 to illuminate the lamp 26 under the correct key 18.

Figure 5:
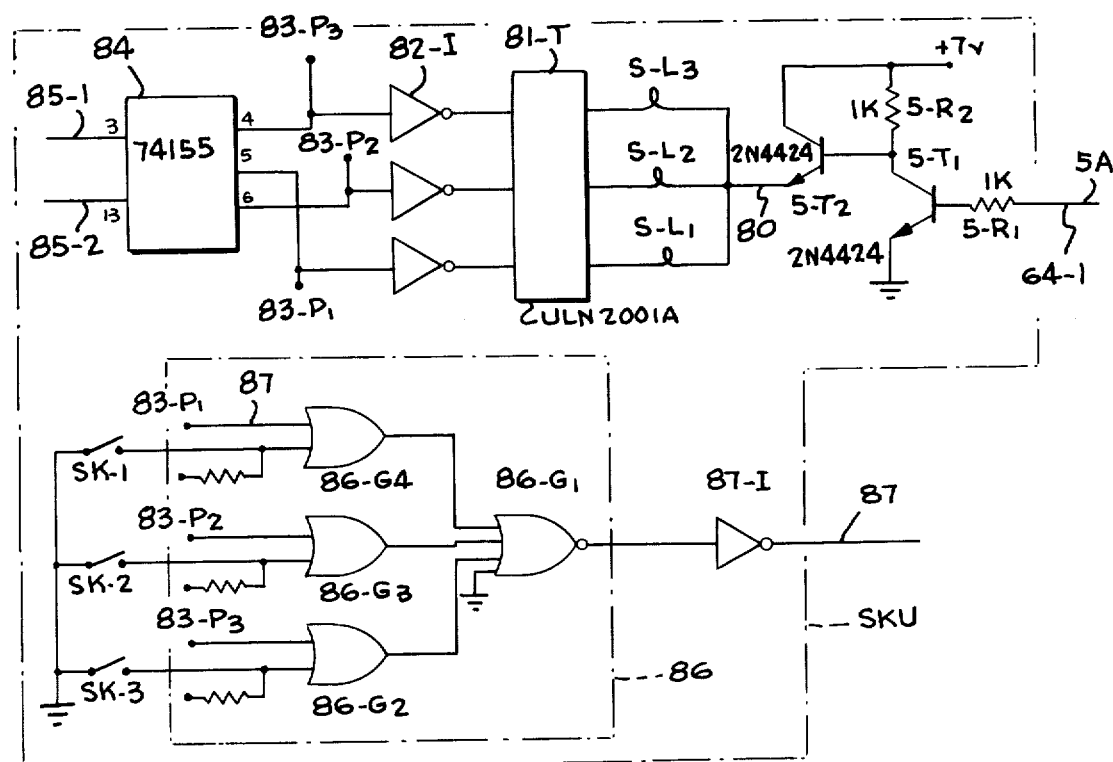

Referring now to FIG. 5, illustrating circuitry and simultaneous key coordinating and interface connections forming the block Simultaneous Key Unit or SKU of FIGS. 2 and 3A, it will be noted that the enable lead 64 to the X-axis decoder 66 also connects at 5A to a lead 64-1 supplying a signal from the lead 64 through a 1K resistor 5-R1 to the base of transistor 5-T1 whose emitter is connected to ground and whose collector is connected through 1K resistor 5-R2 to a +7 volt supply. The collector of the transistor 5-T1 is also connected to the base of transistor 5-T2 whose collector is connected to the +7 volt supply and whose emitter is connected through lead 80 providing the positive lamp supply voltage connection to either of three parallel lamps indicated a S-L1, S-L2 and S-L3 forming respectively the lamps beneath the left shift key SK1, the right shift key SK-2, and a computer control key SK-3 on the keyboard. The other side of these three parallel lamps are connected through an interface transistor bank 81-T formed of a ULN2001A integrated circuit having three transistor driver pairs each having a circuit as indicated at FIG. 5A whose collectors are respectively connected to the three parallel simultaneous key lamps S-L1, S-L2 and S-L3. The base of the input transistor 81-T1 of these three transistor pairs of transistor bank 81-T are each connected through respective 7404 inverters indicated at 82-I to connection points 83-P1, 83-P2 and 83-P3 connected to pins 1, 2 and 3 respectively of a No. 74155 2-line to-4-line decoder 84. The two input lines to the decoder 84, indicated at 85-1 and 85-2 are connected respectively to an address line from the photocell of the film reading photocells 46 reading the 8th light bar in the light bar code on the film and to the photocell reading the 9th light bar, respectively.

A simultaneous key interface indicated at 86 is also connected at one side by leads 87 to the connecting points 83-P1, 83-P2 and 83-P3 and the other side of this simultaneous key interface 86 is connected through the inverter 87-I to pins 3 and 4 of the one-shot multivibrator 51-M1 by lead 87. These pins have a capacitor connected between them and ground, for the purpose of providing a low voltage level from the inverter 87-I to the multivibrator 51-M1 when the correct simultaneous key is depressed to enable the multivibrator 51-M1. The interface 86 includes a NOR gate 86-G1 whose output is connected to inverter 86-I and whose four inputs are connected to the outputs of three Exclusive OR gates 86-G2, 86-G3 and 86-G4 and to ground. The inputs of these Exclusive OR gates are connected to the simultaneous keys SK-1, SK-2 and SK-3 respectively and to a +5 volt source and to the connecting points 83-P1, 83-P2 and 83-P3.

The decoder 84 is such that if both of the light bars zones associated with the two input leads 85-1 and 85-2 are black, there is no output from the decoder 84 on the three output pins; if the 8th light bar is white and the 9th is black, assuming these two light bar zones to be in the 8th and 9th positions, the connection 83-P1 goes low; if the 9th position is white and the 8th position is black, the connection 83-P2 goes low; and if both light bars being monitored are white, then the connection 83-P3 goes low.

With this circuitry, when the instruction material being displayed on the screen by the film presently being projected thereon presents an added information bit which calls for depression of one of the simultaneous keys such as left shift key SK-1, right shift key SK-2 or control key SK-3, as well as engagement of one of the alpha-numeric keys, the address lines forming the input leads 85-1 and 85-2 to the decoder 84 are conditioned by the light bars so that the voltage at the connection point 83-P1 or 83-P2 or 83-P3 appropriate to the simultaneous key goes low, applying a low voltage to the input on the pins 2, 5 or 9 of the appropriate Exclusive OR gate 86-G2, 86-G3 or 86-G4. Accordingly, when the proper simultaneous key SK-1, SK-2 or SK-3 is depressed, grounding the connection to the other input on pin 1, 4 or 10 of the relevant Exclusive OR gate, that Exclusive OR gate provides a down or low output because the two inputs match, which then activates the NOR gate 86-G1 to provide a logic high or up level on its output to the inverter 87-I, causing the multivibrator 51-M1 to be enabled so that depression of the correct alphanumeric key will cause the multivibrator 51-M1 to produce an output indicating a correct count to the gate 51-G1 and the correct counter 36.

FIG. 4 illustrates in schematic diagram form the circuit for the photocell interface board or panel, indicated generally by the reference character 70, for processing the output signals from the film reading photocells 46 for application to the address line 45, 67 and 68 to the multiplexers 42 and 44 and to the decoders 65 and 66. The film reading photocells, indicated generally by the reference character 46, are incorporated in the audio/visual projector 35 and arranged, in the described preferred embodiment, as a vertical bank of 10 photocells, only 3 of which are illustrated in FIG. 4 as photocells 46a, 46b and 46j, positioned in the audio/visual projector at a location to receive light from the light bar code material on the margin of the film in the cassette or cartridge positioned in the projector section 35a. This may be done, for example, by providing stationary mirrors or prisms in the projector to direct light from the marginal light bar pattern on the film onto the vertically arranged bank of photocells 46. The bank of photocells in the described embodiment consists of 9 data sensor phototransistors for sensing the coded light bar patterns on the upper margin of the film indicating the proper key positions for the added information bit of the associated film frame, and a 10th phototransistor, which is designated the reference sensor and indicated at 46j. This 10th phototransistor is positioned, in the example, in the middle of the column to have light directed onto it from an always-transparent light bar on the film margin at a position to be directed onto reference photocell 46j. The phototransistor 46a to 46j may be L14 phototransistors, having their collectors connected to a source of +5 volts DC and their emitters connected to 10 output leads, respectively, some of which are indicated at 46-La, 46-Lb and 46-Lj for connection by a cable from the projector 35 to connect to 10 input leads such as leads 70-La and 70-Lj of the photocell interface board 70. Each of the input leads, such as 70-La, for the 9 light bar code data sensor photocells 46a–46i form inputs for 9 separate signal processing channels which are identical, and for which, therefore, only the channel for data sensor photocell 46a will be described. The input lead 70-La is connected through resistor 70-R1 to the positive input of a comparator Operational Amplifier 70-OA, which may be an LM3900, and a resistor network consisting of 50K potentiometer 70-R2 and 1K resistor 70-R3 is connected between the input lead 70-La and ground. The negative input of the comparator Operational Amplifier 70-OA is connected to a reference voltage forming circuit receiving signals from the reference photocell 46j.

The signals from the photocell 46j are applied to the reference circuit input lead 70-Lj connected to the base of transistor 70-T which may be a 2N4424 transistor having its collector connected to +5 volts DC. The lead 70-Lj also connects through 50K potentiometer 70-R4 and 1K potentiometer 70-R5 to ground, and the emitter of the transistor 70-T is connected through 10K threshold adjust potentiometer 70-R6 and 1K resistor 70-R7 to ground. The movable contact of the threshold adjust potentiometer 70-R6 has a 22 uf capacitor 70-C1 connected between the movable contact and ground and connects through 51K resistor 70-R8 to the positive input of the comparator Operational Amplifier 70-OAj.

Since the BESELER Cue/See projector of the preferred embodiment is of the type having a continuously driven shutter which periodically intercepts and then opens the light path to the projector screen even when still film frames, as distinguished from movie film frames, are being projected, to have the capability for both still film and movie film projection, a special latch circuit arrangement is provided for the Operational Amplifier outputs for the bar code sensing channels. Thus, the nine output leads from the Operational Amplifiers 70-OAa to 70-OAi are connected to the upper input pin, in this case pin 2, of a respective associated one of the latch integrated circuit stages 70-LCa to 70-LCi, formed for example of ¼ of a Texas Instruments 7475 latch integrated circuit. The other input pins, designated the clock input, (which is the pin 13) for the nine latch integrated circuits 70-LC are connected through an inverter, such as inverter 70-I1 to the output of a one-shot multivibrator 70-M1. The input to this multivibrator 70-M1 is connected to the output of the Operational Amplifier 70-OAj having its plug input connected through the 51K resistor 70-R8 and a threshold test point to the movable contact of the threshold adjust resistor 70-R6. With this arrangement, the multivibrator 70-M1 generates a narrow clock pulse when the light bar for the reference light bar position returns to transparent or light, as distinguished from dark, condition by reason of the projector shutter opening, thus providing a clock pulse input to the clock pulse input pins of each of the integrated circuit latch stages 70-LCa to 70-LCi. The operation of the latch integrated circuits 70-LC is such that they put whatever is on the data input on the respective output leads 71a–71i and hold that output until the next clock pulse, such that if the data input is plus or high, the output is high and if the data input is low, the output is low. Thus the voltage on the data input pin stays on the output lead 71 from each latch circuit 70-LC even when the shutter blocks off the light because of the clock pulses generated by the multivibrator 70-M1 of the reference channel and the operation of the latch circuits. The voltages on the output leads 71 from the latch circuits provide the address voltages for the decoders and multiplexers and are connected to the address line inputs in a printed circuit board installation, for the address lines 45, 67 and 68, to condition them in accordance with the coded light bar material on the film margin.

It will be understood that in the learning mode of the apparatus, the trainee, when the trainee touches one of the keys 18 on the keyboard 16, closes the associated switch 28 under the activated key and produces a signal which is processed by the interface 43 to provide a logic 1 signal to the OR gate network 53, providing a signal indicating that a key 18 has been activated, whether or not it is the correct key for the bit of instruction, lesson information or knowledge item being displayed on the screen 21. If the correct key 18 was activated, as determined by the signals on the address leads to the horizontal and vertical multiplexers 44 and 42 and the horizontal and vertical matrix conductors of the switch matrix 30 cross-connected by the closed switch 28 for the depressed key 18, NAND gate 49 is activated to provide a logic 1 output to the correct/error detector 51 indicating that the correct key 18 was activated. This causes the correct/error detector 51 to provide an output on the lead 55 and 56 to cause the film advance relay control 57 to advance the film to the next frame and also through the coupling network 58 causes the correct counter 36 to be advanced one count. If an incorrect key 18 was activated, the NAND gate 49 output goes high, activating the correct/error detector 51 to cause the error counter 38 to be advanced one count, and activating the flip-flop 62 to provide a low enable signal to the decoders 65 and 66 to cause the correct lamp 26 to be illuminated, thus advising the trainee of the correct key for that film frame lesson list or information.

On the test mode, the training/test mode switch TT-S disconnects the film advance relay control 57 from the output of the correct/error detector and instead connects the film advance control to the pin 6 output of the 50 millisecond one-shot multivibrator 51-M3 to cause the film frame to be advanced each time the output from the OR gate network 53 indicates that a key 18 has been activated, whether or not it is at the correct key location.

We claim:

1. Keyboard training apparatus for teaching keyboard operations and knowledge items and skills, comprising a desk supported type console having a lower keyboard section and a display and film cassette section surmounted thereon including a generally vertically arranged display screen facing a keyboard operator position, the keyboard section including a generally horizontal keyboard of plural individual touch keys each having a light transmitting upper key face respectively representing individual characters and keyboard operations, the keys each having a switch associated therewith to be closed upon touching of the associated key, a visual projector to be located within view of the trainee having a viewing screen and means receiving a training film having frames for successively displaying lesson information in the screen depicting key operation lesson instruction correlated with the keys of the keyboard, the film frames having sensor activating code markings of different light transmissive characteristics along a margin thereof denoting the correct key location for the displayed lesson instruction, sensor means for sensing said code markings and producing correct key location signals responsive to said code markings, said keyboard including a light emitter beneath the key face of each key for illuminating said key face of its associated key from immediately below said key face; electronic circuit means coupled to said switches and said correct key location signals including grid a type switch matrix immediately below said keyboard producing signals indicating by a matrix coordinate code the location of each activated key switch, correct/error detector means responsive to said last mentioned signals for sensing the key location on said keyboard of each key switch activated by the trainee and sensing the key location signified by said correct key location signals, correct and incorrect readout counters activated by said detector means to indicate the number of correct and incorrect key activations, and said electronic circuit means includes means responsive to said correct key location signals and to each activation of said key switches to activate the light emitter at the correct key location when a key at an incorrect location is activated.

2. Keyboard training apparatus as defined in claim 1, wherein said electronic circuit means further includes means producing a count signal for each activation of any of the keys and their associated key switches and means responsive to each said count signal and to an error signal from said detector means indicating activation of an incorrect key switch to activate the light emitter for the key at the correct key location.

3. Keyboard training apparatus as defined in claim 1, wherein said apparatus includes a mode switch for placing the apparatus in a training mode enabling said light emitter to be activated upon each activation of one of said key switches at an incorrect key location and for conditioning the apparatus in a test mode disabling the means for activating the light emitter at correct key locations when incorrectly located keys and their switches are activated.

4. Keyboard training apparatus as defined in claim 2, wherein said apparatus includes a mode switch for placing the apparatus in a training mode enabling said light emitter to be activated upon each activation of one of said key switches at an incorrect key location and for conditioning the apparatus in a test mode disabling the means for activating the light emitter at correct key locations when incorrectly located keys and their switches are activated.

5. Keyboard training apparatus as defined in claim 2, wherein said electronic circuit means includes a film frame advancing circuit activated by each correct count signal produced by said detector means for automatically advancing the training film in the projector to the next frame only upon activation of the key and its switch for the correct key operation instruction being displayed on the screen.

6. Keyboard training apparatus as defined in claim 3, wherein said electronic circuit means includes a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

7. Keyboard training apparatus as defined in claim 6, wherein said electronic circuit means includes multiplexer means addressed by said correct location signals and gate means connected thereto for producing a correct input signal to said detector means when the key switch for the key locations signified by the correct location signals for an associated film frame is activated.

8. Keyboard training apparatus as defined in claim 6, wherein said electronic circuit means further includes circuit means operative when the mode switch is in test position for causing the training film to be advanced one frame for each activation of one of the touch keys and its switch regardless of whether it is at a correct or incorrect key location.

9. Keyboard training apparatus as defined in claim 7, wherein said electronic circuit means further includes circuit means operative when the mode switch is in test position for causing the training film to be advanced one frame for each activation of one of the touch keys and its switch regardless of whether it is at a correct or incorrect key location.

10. Keyboard trainer apparatus as defined in claim 1, wherein said electronic circuit means includes multiplexer means addressed by said correct location signals and gate means connected thereto for producing a correct input signal to said detector means when the key switch for the key location signified by the correct location signals for an associated film frame is activated, further gate means coupled to said switch matrix to produce a count input signal to the detector means for each activation of one of the key switches regardless of whether the activated switch was in the key location signified by the associated correct location signals, and said detector means having means responsive to said correct input signals and count input signals for producing a correct count output signal and an error count output signal for said readout counters continuously monitoring correct and incorrect activation of the keys and their associated switches.

11. Keyboard trainer apparatus as defined in claim 2, wherein said electronic circuit means includes multiplexer means addressed by said correct location signals and gate means connected thereto for producing a correct input signal to said detector means when the key switch for the key location signified by the correct location signals for an associated film frame is activated, further gate means coupled to said switch matrix to produce a count input signal to the detector means for each activation of one of the key switches regardless of whether the activated switch was in the key location signified by the associated correct location signals, and said detector means having means responsive to said correct input signals and count input signals for producing a correct count output signal and an error count output signal for said readout counters continuously monitoring correct and incorrect activation of the keys and their associated switches.

12. Keyboard trainer apparatus as defined in claim 6, wherein said electronic circuit means includes multiplexer means addressed by said correct location signals and gate means connected thereto for producing a correct input signal to said detector means when the key switch for the key location signified by the correct location signals for an associated film frame is activated, further gate means coupled to said switch matrix to produce a count input signal to the detector means for each activation of one of the key switches regardless of whether the activated switch was in the key location signified by the associated correct location signals, and said detector means having means responsive to said correct input signals and count input signals for producing a correct count output signal and an error count output signal for said readout counters continuously monitoring correct and incorrect activation of the keys and their associated switches.

13. Keyboard trainer apparatus as defined in claim 7, wherein said electronic circuit means includes multiplexer means addressed by said correct location signals and gate means connected thereto for producing a correct input signal to said detector means when the key switch for the key location signified by the correct location signals for an associated film frame is activated, further gate means coupled to said switch matrix to produce a count input signal to the detector means for each activation of one of the key switches regardless of whether the activated switch was in the key location signified by the associated correct location signals, and said detector means having means responsive to said correct input signals and count input signals for producing a correct count output signal and an error count output signal for said readout counters continuously monitoring correct and incorrect activation of the keys and their associated switches.

14. Keyboard trainer apparatus as defined in claim 13, wherein the electronic circuit means including a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

15. Keyboard trainer apparatus as defined in claim 10, wherein the electronic circuit means including a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

16. Keyboard trainer apparatus as defined in claim 7, wherein the electronic circuit means including a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

17. Keyboard trainer apparatus as defined in claim 8, wherein each of the electronic circuit means including a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

18. Keyboard trainer apparatus for teaching keyboard operations and knowledge items and skills, comprising a keyboard of plural individual touch keys respectively representing individual characters and keyboard operations, the keys of each having a switch associated therewith to be closed upon touching of the associated key, a visual projector to be located within view of the trainee having a viewing screen and means receiving a training film having frames for successively displaying lesson information on the screen depicting key operation lesson instruction correlated with the keys of the keyboard, the film frames having sensor activating code means denoting the correct key location for the displayed lesson instruction, sensor means for producing correct key location signals responsive to said code means, said keyboard including a light emitter at each key for illuminating its associated key, electronic circuit means coupled to said switches and said correct key location signals including correct/error detector means for sensing the key location on said keyboard of each key switch activated by the trainee and sensing the key location signified by said correct key location signals, correct and incorrect readout counters activated by said detector means to indicate the number of correct and incorrect key activations, and said electronic circuit means including means responsive to said correct key location signals and to each activation of said key switches to activate the light emitter at the correct key location when a key at an incorrect location is activated, said electronic means including a switch matrix intercoupled with said key switches for producing matrix coordinate signals indicating the location coordinates of the activated key switch, multiplexer means addressed by said correct location signals and gate means connected thereto for producing a correct input signal to said detector means when the key switch for the key location signified by the correct location signals for an associated film frame is activated, further gate means coupled to said switch matrix to produce a count input signal to the detector means for each activation of one of the key switches regardless of whether the activated switch was in the key location signified by the associated correct location signals, and said detector means having means responsive to said correct input signals and count input signals for producing a correct count output signal and an error count output signal for said readout counters continuously monitoring correct and incorrect activation of the keys and their associated switches.

19. Keyboard trainer apparatus as defined in claim 18, wherein each of said keys are translucent and are bottom-illuminated by their associated light emitters, the electronic circuit means including a light emitter matrix intercoupled with said light emitters at said keys having decoder means coupled with said matrix for selectively activating the individual light emitters, and means coupled to said decoder means to be activated by error count output signals from the detector means for activating the light emitter for the correct key to visually identify the correct key location to the trainee.

* * * * *